United States Patent
Knauer

(10) Patent No.: US 10,322,628 B2
(45) Date of Patent: Jun. 18, 2019

(54) CONTROLLABLE AIR INLET FOR A MOTOR VEHICLE

(71) Applicant: Decoma (Germany) GmbH, Sulzbach (DE)

(72) Inventor: Bernd Knauer, Esslingen (DE)

(73) Assignee: MAGNA Exteriors GmbH, Sulzbach (DE)

(*) Notice: Subject to any disclaimer, the term of this patent is extended or adjusted under 35 U.S.C. 154(b) by 840 days.

(21) Appl. No.: 13/966,539

(22) Filed: Aug. 14, 2013

(65) Prior Publication Data
US 2015/0050875 A1    Feb. 19, 2015

(30) Foreign Application Priority Data
Aug. 14, 2012   (DE) .................. 10 2012 214 474

(51) Int. Cl.
*B60H 1/34*    (2006.01)
*B60K 11/08*   (2006.01)

(52) U.S. Cl.
CPC ............ *B60K 11/085* (2013.01); *Y02T 10/88* (2013.01)

(58) Field of Classification Search
CPC .............................. B60K 11/085; Y02T 10/88
USPC ................................................ 454/152, 155
See application file for complete search history.

(56) References Cited

U.S. PATENT DOCUMENTS

| 7,354,340 B2* | 4/2008 | Mochizuki ............ B60H 1/3421 454/152 |
| 7,780,508 B2* | 8/2010 | Okuno .................. B60H 1/3428 454/109 |
| 2006/0060401 A1 | 3/2006 | Bole |
| 2015/0231962 A1* | 8/2015 | Ruppert ............... B60K 11/085 180/68.1 |
| 2015/0321548 A1* | 11/2015 | Hori ...................... B60K 11/085 180/68.1 |

FOREIGN PATENT DOCUMENTS

| DE | 4422537 A1 | 1/1996 |
| DE | 20021023 U1 | 2/2001 |
| DE | 10024692 A1 | 11/2001 |
| DE | 202005010683 A1 | 9/2005 |
| DE | 602004007338 T2 | 3/2008 |
| DE | 102008049010 A1 | 4/2010 |
| DE | 102012100537 A1 * | 7/2013 ........... B60K 11/085 |
| EP | 2233341 A1 | 9/2010 |
| EP | 2233342 A1 | 9/2010 |
| EP | 2325035 A1 | 5/2011 |
| EP | 2335963 A1 | 6/2011 |
| KR | 20120106034 A * | 9/2012 |

* cited by examiner

*Primary Examiner* — Helena Kosanovic
(74) *Attorney, Agent, or Firm* — Jordan IP Law, LLC; Todd A. Vaughn

(57) ABSTRACT

A controllable air inlet for controlling airflow to a cooling device of an internal combustion engine of a motor vehicle. The air inlet includes a frame, a lateral member and a closure element moveably supported by the frame and the lateral member.

19 Claims, 2 Drawing Sheets

CONTROLLABLE AIR INLET FOR A MOTOR VEHICLE

CROSS-REFERENCE TO RELATED APPLICATIONS

The present application claims priority under 35 U.S.C. § 119 to German Patent Application No. DE 10 2012 214 474.9 (filed on Aug. 14, 2012), which is hereby incorporated by reference in its entirety.

TECHNICAL FIELD

A controllable air inlet for a motor vehicle configured to control the air supplied to a heat exchanger or other cooling device of an internal combustion engine.

BACKGROUND

In modern motor vehicles, airflow to a heat exchanger is controlled by way of adjustable elements in order to improve the warm operation behaviour of the engine. Examples of such devices described are set out in EP 2 233 341 A1, EP 2 233 342 A1, EP 2 325 035 A1, DE 10 2008 049 010 A1, DE 20 2005 010 683 U1 and DE 60 2004 007 338 T2.

Such adjustable elements, e.g., the closure elements, are generally a plurality of pivotably supported plates, the pivot axes thereof being orientated parallel with each other and being rotatably arranged as a whole in a frame. The frame together with the plate arrangement is arranged downstream of the design portion of the radiator grill, and thus, arranged upstream of the heat exchanger of the engine.

Such an arrangement may also be arranged in a flow channel, via which cool air is supplied from an opening arranged in the bodywork to the heat exchanger, the cooler of the engine. By closing the fresh air supply during warm operation or by controlling the quantity of cool air in accordance with the engine temperature, the optimal operating temperature is reached more quickly or may be maintained within a narrow temperature range.

The closure elements set out are constructed as elongate surface elements having a substantially planar form and may be pivoted about an axis which extends in most cases centrally through the surface element. A plate having a streamlined cross-section is set out in EP 2 335 963 A1.

Known closure elements usually comprise plastics material and are introduced into the frame which receives them by way of a deformation, a bending action. Owing to bending of the plate member, the pins of the plates which constitute the rotatable support are introduced into corresponding receiving members of a frame. Such an assembly process, however, may be automated only with great complexity. The same applies when in particular the frame which receives the closure elements is also intended to be deformed for assembly.

SUMMARY

In accordance with embodiments a controllable air inlet has a structural configuration which is enhanced when compared with known configurations.

Embodiments are directed to a controllable air inlet for a motor vehicle configured to control the air supplied to a heat exchanger or other cooling device of an internal combustion engine, includes at least one of: a frame portion which supportingly receives at least one closure element configured for pivoting about a longitudinal axis, the closure element being supported at each of the ends thereof in a bearing receiving member, a first bearing receiving member being arranged on the frame portion and a second bearing receiving member being arranged on a lateral portion which may be connected to the frame portion.

In accordance with embodiments, the frame which receives the closure elements supported in a pivotable manner may have a separate component which, after the closure elements have been inserted, is connected to the frame portion and then ultimately receives the closure elements in a supporting manner.

Embodiments are directed to a controllable air inlet for a motor vehicle and configured to control airflow to a cooling device of an internal combustion engine, the controllable air inlet including at least one of: a frame having first and second opposing sidewalls; a lateral portion provided at the first sidewall of the frame; at least one first bearing receiving member arranged on the second sidewall and at least one second bearing receiving member arranged on the lateral portion; and at least one closure element received by the at least one first bearing receiving member and the at least one second bearing receiving member for pivotal movement about the longitudinal axis of the at least one closure element.

Embodiments are directed to an air inlet configured to control airflow to a cooling device of an internal combustion engine, the air inlet including at least one of: a frame having first and second opposing sidewalls and a plurality of first bearing receiving members on the second sidewall; a lateral portion connected to the first sidewall of the frame, the lateral portion having a plurality of second bearing receiving members; a plurality of closure elements each received by corresponding first and second bearing receiving members for pivotal movement relative to the frame about a pivot axis; a first pin provided at first and second ends of each closure element and which pivotably supports the closure element body and form the pivot axis; and a second pin provided spaced apart from the pivot axis at the second end of each closure element and which is connected to an actuator which is configured to pivot the closure elements.

Embodiments are directed to an air inlet for a motor vehicle, the air inlet including at least one of: a frame having a first sidewall and a second sidewall spaced from the first sidewall; a first bearing receiving member on the second sidewall; a lateral member on the second sidewall of the frame; a second bearing receiving member on the lateral member; a closure element extending in the space between to the first and second sidewalls for pivotal movement relative thereto; a first pin provided at ends of the closure element and which pivotably supports the closure element; and a second pin provided spaced apart from the first pin at one of the ends of the closure element and which is connected to an actuator for the closure element.

In accordance with embodiments, the separate component is constructed as a lateral portion of the frame portion and, after the closure elements have been inserted into the frame, is placed thereon and locked for fixing. When the lateral portion has been removed, the closure elements are inserted into the frame, this being carried out by way of simple operations and in particular without any deformations of the frame and/or the closure elements being required for this purpose.

In accordance with embodiments, the frame portion which receives the closure elements, together with the lateral portion, may support the closure elements by way of a pin which is formed at each end of the closure element. The pins of the closure elements may be inserted at one side in corresponding bearing receiving members of the frame. At the other side, the pins, owing to the lateral portion which has not yet been fitted, are free in the insertion direction, such as, for example, in the direction towards the side. By placing the lateral portion on the frame, the previously free pins are engaged and thus permanently supported.

In accordance with embodiments, after insertion into the bearing openings of the frame portion, the pins of the closure elements may be placed in a manner open at one side onto correspondingly formed support portions. To this end, the lateral portion has correspondingly constructed bearing portions so that, by the lateral portion being placed on the free end of the frame portion, the previously free ends of the closure elements are now held in a supporting manner, so as to be fixed in position.

In accordance with embodiments, the lateral portion may be secured to the frame, the frame portion, by way of catch elements. In particular, the associated guiding and catch way are constructed in such a manner that the movement which is intended to be carried out when the lateral portion is attached extends substantially parallel with the support direction of the closure element(s). In order to ultimately fix the closure elements over the previously free pins, the lateral portion must thus be simply pushed onto the free end of the frame portion, whereupon the engagement is then carried out.

Advantageously, closure elements of different lengths may also be fixed to a frame portion. To this end, the lateral portion has the articulation receiving members (bearing receiving members for the articulation pins) which are associated with the closure elements which are constructed with different lengths.

In accordance with embodiments, the fixing, engagement of the lateral portion to the frame element may be carried out by way of a C-shaped enclosure of an edge which is constructed in a flat manner, a free end of the frame portion. Advantageously, additional rigidity is thereby produced when the lateral portion is mounted. A particularly secure catch connection is also thus further produced.

DRAWINGS

Embodiments are described by way of example below with reference to the drawings.

DESCRIPTION

Figure 1:
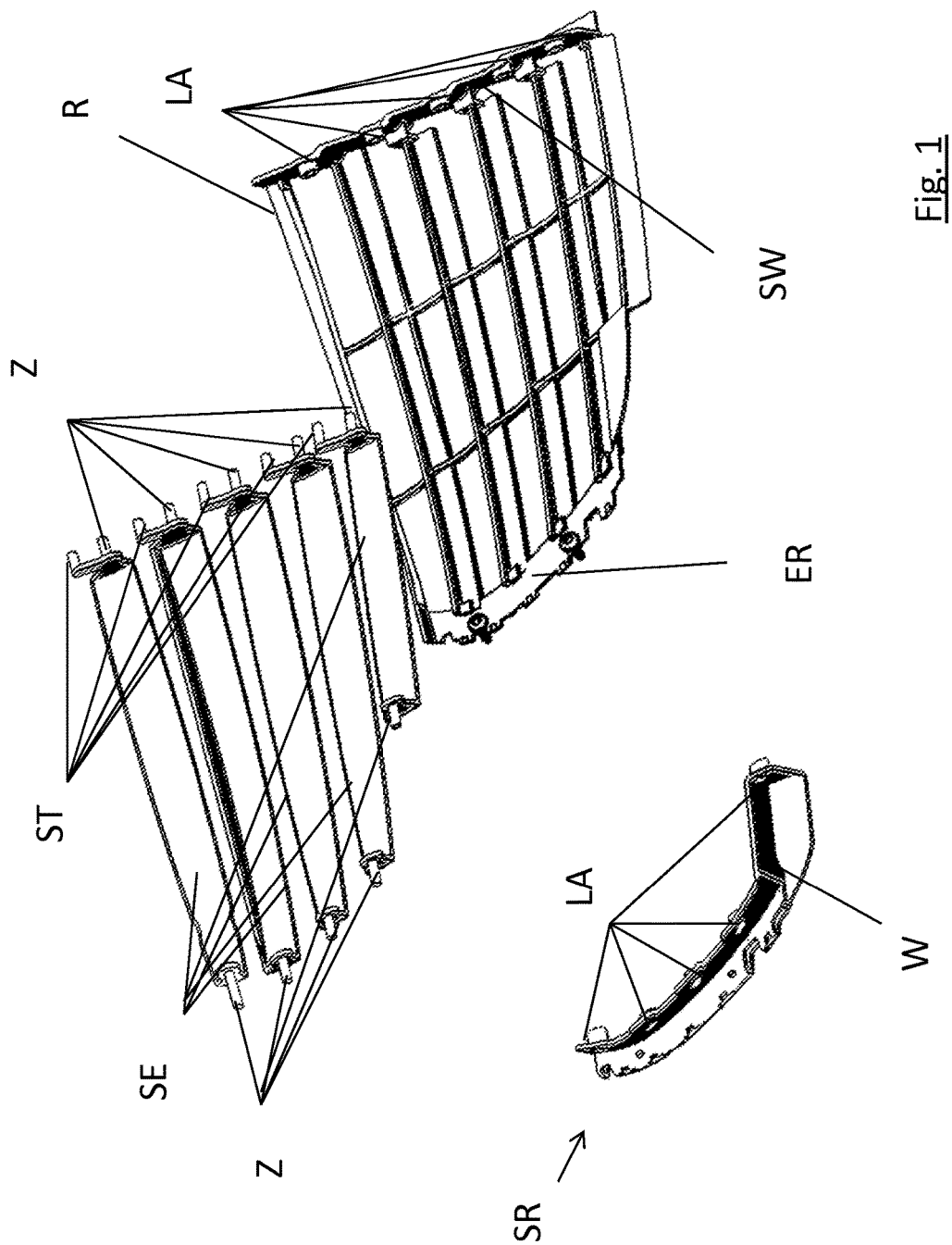
FIG. 1 illustrates a controllable air inlet in accordance with embodiments.

FIG. 1 illustrates a frame portion R as a receiving member for closure elements SE which may be pivoted about the longitudinal axis thereof. The frame portion R is constructed as one-half of a carrier which is arranged behind a non-illustrated design portion of a radiator grill for the closure elements SE which constitute the controllable air inlet. The frame portion R includes a plurality of pivotably supported closure elements SE each having different lengths.

Each closure element SE has at each of the ends thereof a first pin Z which provides pivotable support and which thus form the pivot axis of a closure element SE, respectively. At one end, the closure elements SE may additionally have a second pin ST which is arranged spaced from the pivot axis and which serves to articulate an actuation element.

The actuation element (not illustrated), is constructed as a unit which transmits tensile and thrust forces and is accordingly displaceably supported outside the frame portion R. The actuation element may be used to pivot the closure elements SE of the two frame portions R which are arranged adjacent to each other and which are accordingly constructed in a mirror-symmetrical manner relative to each other. The pins ST of the closure elements SE are suspended in carrier openings of the actuation element so that a displacement of the actuation element brings about a pivoting of all the closure elements SE on the two frame portions R which are located beside each other.

The closure elements SE are inserted with the pins Z at the front into the respectively associated bearing receiving members LA of the frame portion R. The bearing receiving members LA rest in a lateral wall SW which extends substantially perpendicularly relative to the extension plane of the frame portion R. The closure elements SE which are inserted into the bearing receiving members LA now rest on the frame portion R with the openings for the passage of air.

A lateral portion SR, which is placed on the open end ER of the frame portion R that is constructed as a wide tongue, may contain the bearing receiving members LA for the pins Z of the closure elements SE which are inserted at one side into the lateral wall SW of the frame portion R. The bearing receiving members LA of the lateral portion SR are also arranged in a wall W which extends perpendicularly relative to the lateral portion SR. The portion of the lateral portion SR which adjoins below the wall W of the lateral portion SR is constructed as a portion which surrounds the end ER of the frame portion R at both sides and which has a C-shaped profile.

Figure 2:
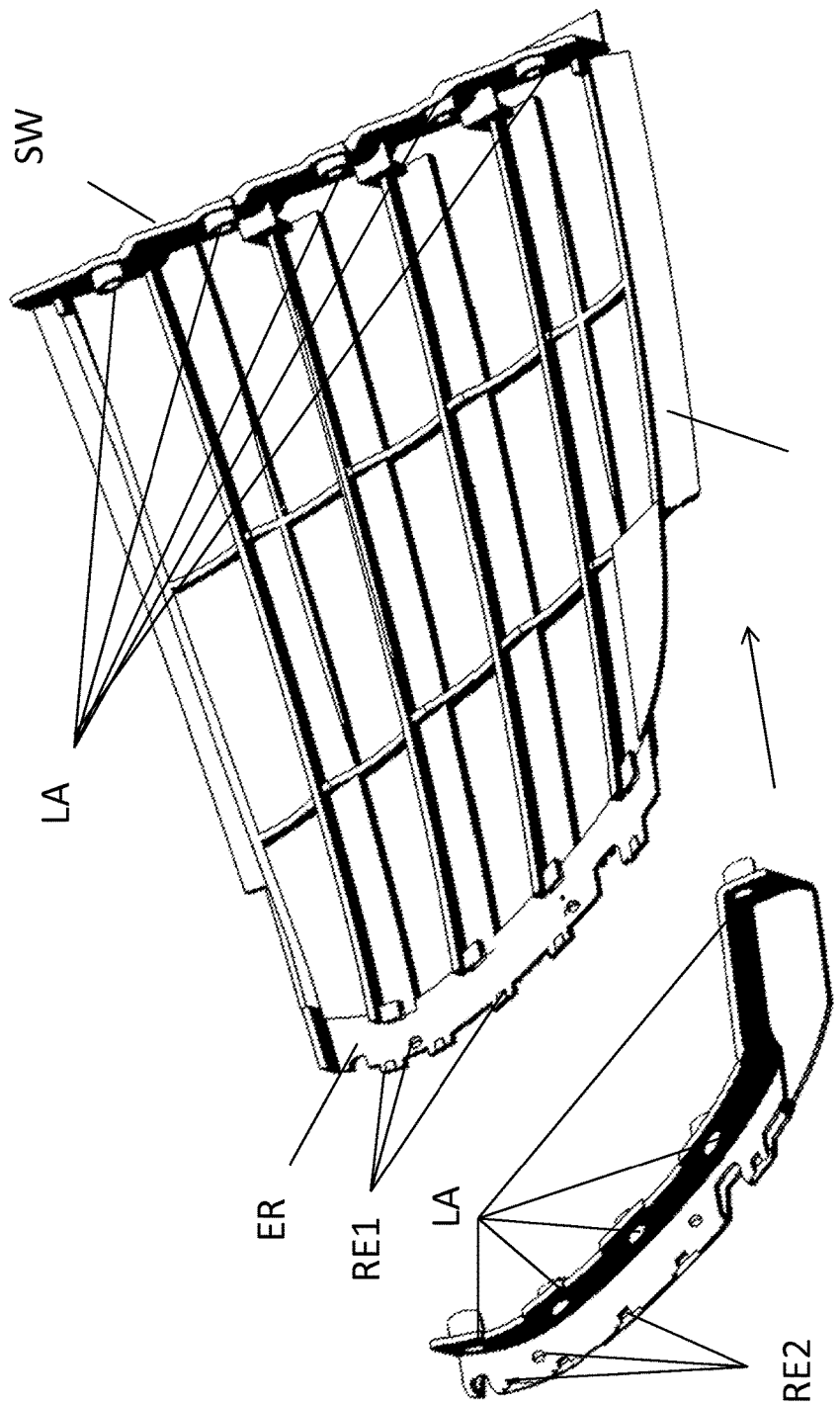
FIG. 2 illustrates a frame portion and a lateral portion in accordance with embodiments.

FIG. 2 illustrates the frame portion R with the bearing receiving members LA which are arranged in the lateral wall SW for the closure elements SE. The frame portion R has openings which are formed by horizontally and vertically extending struts for air throughput. Each closure element SE which is intended to be connected to the frame portion R is associated with a horizontally orientated opening region, the opening regions being separated from each other by way of wide horizontal struts and being reinforced by way of thin vertical struts.

The lateral portion SR with the perpendicularly extending lateral wall W of the bearing receiving members LA has a region which has a C-like profile and which serves to receive the flat open end ER of the frame portion R. The flat open end ER of the frame portion R has securing means RE1 which serve to guide and engage and cooperate with corresponding structures RE2 of the C-shaped region of the lateral portion SR. The arrow illustrated in FIG. 2 indicates the insertion direction of the lateral portion SR on the open end ER of the frame portion R. It may be seen, in particular in comparison with FIG. 1, that the insertion direction of the lateral portion SR on the open end ER of the frame portion R extends in the direction of the pivot axes of the closure elements SE or those of the pins Z which provide the support.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

R Frame/Frame portion
SE Closure element/Closure plate
Z Pin/Bearing pin
LA Bearing receiving member/Receiving member for pins
ST Articulation pin/Actuation element
SW Lateral wall/Sidewall (frame portion)
SR Lateral portion
W Lateral wall/Sidewall
ER Open end (frame portion)
RE1 Securing mechanism (frame portion)
RE2 Securing mechanism (lateral portion)

What is claimed is:

1. An air inlet configured to control airflow to a cooling device of an internal combustion engine of a motor vehicle, the air inlet comprising:
    a frame having a first sidewall and a second sidewall positioned opposite to the first sidewall, the second sidewall having at least one first bearing receiving member;
    a lateral member including a groove to removeably receive the first sidewall of the frame so that the first sidewall is received into the lateral member to be within the groove so as to be surrounded by the lateral member, the lateral member having at least one second bearing receiving member; and
    at least one closure element having:
        a first pin at a first end thereof which is received by the at least one first bearing receiving member by which the at least one closure element pivots, and a second pin arranged vertically spaced apart from the first pin and through which the at least one closure element is actuated, and
        a third pin at a second end thereof which is directly attached to the at least one second bearing receiving member by which the at least one closure element pivots, wherein the first pin and the third pin define a pivot axis about which the at least one closure element pivots relative to the frame,
    wherein the first sidewall includes a first surface and a second surface opposite the first surface, the first surface and the second surface being arranged as outermost surfaces of the first sidewall along a line perpendicular to the pivot axis, the first sidewall arranged for receipt into the frame so that both the first surface and the second surface are respectively received into the groove.

2. The air inlet of claim 1, further comprising a first securing mechanism arranged on the frame.

3. The air inlet of claim 2, wherein the lateral member has a second securing mechanism configured to engage with the first securing mechanism and attach the lateral member to the frame.

4. The air inlet of claim 1, wherein the lateral member comprises a C-shaped cross-section which surrounds an outer edge of the first sidewall of the frame.

5. An air inlet configured to control airflow to a cooling device of an internal combustion engine of a motor vehicle, the air inlet comprising:
    a frame having a first sidewall and a second sidewall positioned opposite to the first sidewall, the second sidewall having a plurality of first bearing receiving members;
    a lateral member including a groove to removeably receive the first sidewall of the frame so that the first sidewall is received into the lateral member to be within the groove so as to be surrounded by the lateral member, the lateral member having a plurality of second bearing receiving members;
    a plurality of closure elements, each respective closure element of the plurality of closure elements having:
        a first pin at a first end thereof which is received by a corresponding one of the first bearing receiving members by which the respective closure element pivots, and a second pin arranged vertically spaced apart from the first pin and through which the respective closure element is actuated, and
        a third pin at a second end thereof which is directly attached to a corresponding one of the second bearing receiving members by which the respective closure element pivots, wherein the first pin and the third pin define a pivot axis about which the respective closure element pivots relative to the frame,
    wherein the first sidewall includes a first surface and a second surface opposite the first surface, the first surface and the second surface being arranged as outermost surfaces of the first sidewall along a line perpendicular to the pivot axis, the first sidewall arranged for receipt into the frame so that both the first surface and the second surface are respectively received into the groove.

6. The air inlet of claim 5, further comprising a first securing mechanism arranged on the frame.

7. The air inlet of claim 6, wherein the lateral member has a second securing mechanism configured to engage with the first securing mechanism and attach the lateral member to the frame.

8. The air inlet of claim 5, wherein the lateral member comprises a C-shaped cross-section which surrounds an outer edge of the first sidewall of the frame.

9. The air inlet of claim 5, wherein the plurality of closure elements each have different lengths.

10. An air inlet for a motor vehicle, the air inlet comprising:
    a frame having a first sidewall and a second sidewall spaced apart from the first sidewall;
    a lateral member including a groove to removeably receive the first sidewall of the frame for attachment thereto and so that the first sidewall is received into the lateral member to be within the groove so as to be surrounded by the lateral member;
    a first bearing receiving member on the second sidewall;
    a second bearing receiving member on the lateral member;
    a closure element extending in the space between to the first sidewall and the second sidewall, the closure element having:
        a first pivot pin at a first end thereof which is received by the first bearing receiving member by which the closure element pivots, and an actuating pin arranged vertically spaced apart from the first pivot pin and through which the closure element is actuated, and
        a second pivot pin at a second end thereof which is directly attached to the second bearing receiving member by which the closure element pivots, wherein the first pivot pin and the second pivot pin define a pivot axis about which the closure element pivots relative to the frame wherein the first sidewall includes a first surface and a second surface opposite the first surface, the first surface and the second surface being arranged as outermost surfaces of the first sidewall along a line perpendicular to the pivot axis, the first sidewall arranged for receipt into the frame so that both the first surface and the second surface are respectively received into the groove.

11. The air inlet of claim 10, further comprising a first securing mechanism arranged on the frame.

12. The air inlet of claim 11, wherein the lateral member has a second securing mechanism configured to engage with the first securing mechanism and attach the lateral member to the frame.

13. The air inlet of claim 10, wherein the lateral member comprises a C-shaped cross-section which surrounds an outer edge of the first sidewall of the frame.

14. The air inlet of claim 1, wherein the third pin is directly attached to the at least one second bearing receiving member so that the third pin is free of direct physical contact with the frame.

15. The air inlet of claim 1, wherein:
the first sidewall is on a first side of the frame, and the second sidewall is on a second side of the frame; and
the lateral member is disposed at the first side of the frame so as to avoid crossing over the at least one first bearing receiving member in a direction from the lateral member to the at least one first bearing receiving member, the direction being along the pivot axis.

16. The air inlet of claim 5, wherein each of the third pins is directly attached to the corresponding one of the second bearing receiving members so that the third pin is free of direct physical contact with the frame.

17. The air inlet of claim 5, wherein:
the first sidewall is on a first side of the frame, and the second sidewall is on a second side of the frame; and
the lateral member is disposed at the first side of the frame so as to avoid crossing over the first bearing receiving members in a direction from the lateral member to the first bearing receiving members, the direction being along the pivot axes.

18. The air inlet of claim 10, wherein the second pivot pin is directly attached to the second bearing receiving member so that the second pivot pin is free of direct physical contact with the frame.

19. The air inlet of claim 10, wherein:
the first sidewall is on a first side of the frame, and the second sidewall is on a second side of the frame; and
the lateral member is disposed at the first side of the frame so as to avoid crossing over the first bearing receiving member in a direction from the lateral member to the first bearing receiving member, the direction being along the pivot axis.

* * * * *